Figure 1:
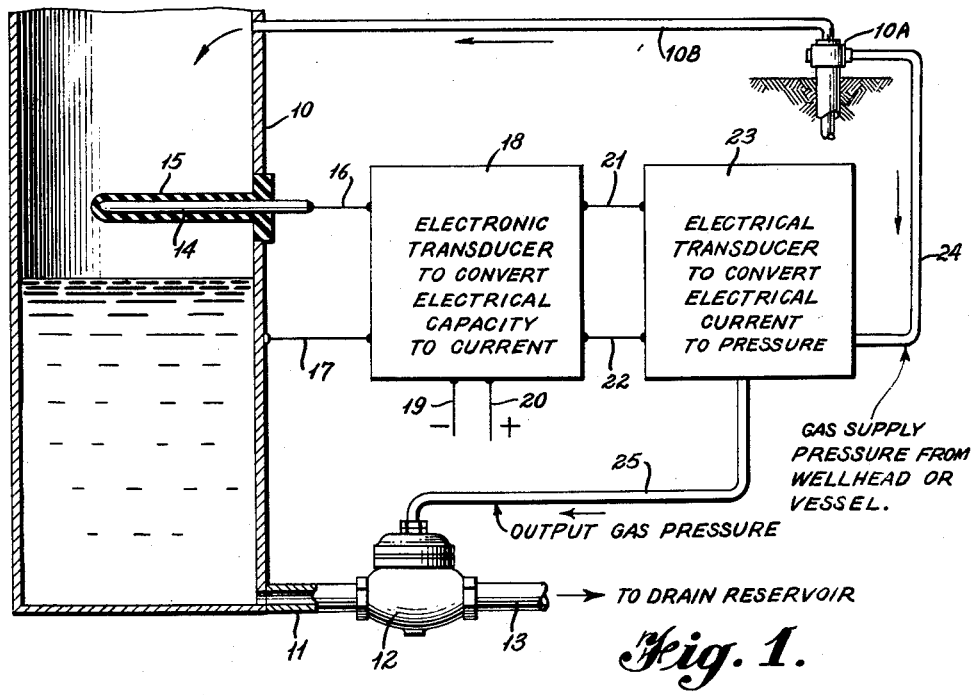

April 12, 1960 W. B. JARZEMBSKI 2,932,315
FLUID LEVEL CONTROL SYSTEM
Filed March 31, 1958

INVENTOR
William B. Jarzembski
BY
Stevens, Davis, Miller & Mosher
ATTORNEYS

United States Patent Office 2,932,315
Patented Apr. 12, 1960

2,932,315

FLUID LEVEL CONTROL SYSTEM

William B. Jarzembski, Tulsa, Okla., assignor to Instruments, Inc., Tulsa, Okla., a corporation of Oklahoma Application March 31, 1958, Serial No. 730,736

1 Claim. (Cl. 137—392)

This invention relates to the control of fluid levels in containers used in connection with the production, storage and transmission of petroleum from oil wells.

The wellheads of oil wells are often located at remote points, not readily accessible. Although the wellhead may be inconveniently located, it is generally desirable to produce its products continuously, or on a regular cycle.

The petroleum from a wellhead is generally passed through, stored in, or transmitted by, some form of container. One of the fundamental requirements in the use of these containers is control of the level of fluids from, or associated with, the wellhead. The control system must be capable of efficiently operating for long periods of time without frequent inspection, adjustment or maintenance. Further, the direct exposure to the full annual cycle of weather conditions necessitate that the components of the control system be sufficiently rugged, physically, to continue their function when exposed directly to all weather conditions.

It has been conventional to provide some form of float on the surface of oil well fluids to actuate a controller of the level of the surface. However, floats become damaged, or corroded and the pivots through which they act become inoperative due to corrosion or the presence of foreign matter on them. Further, the presence of the float, as the primary element of the control system, within the container for the oil well fluid, necessitates opening the container to service this type of primary element.

It is the principal object of the present invention to provide a control apparatus, and location for the apparatus, which is effectively external of a container in which fluid level in the container is controlled.

It is an additional object of the invention to provide a control apparatus with a construction which will keep its electrical power requirements to a minimum.

It is a further object of the invention to provide a control apparatus with a construction, arrangement and location which will enable its fluid pressure power requirements to be provided from fluid pressure within the container or a natural resource closely adjacent the location of the container in which fluid level is controlled.

The invention contemplates a control system whose primary element is responsive to fluid level within a container but which is physically isolated from direct contact with the fluid and container so as to be effectively external of the container, together with the components of the control system which responds to the primary element.

The invention further contemplates a control system with a primary element included in a physically compact and rugged transistorized circuit which uses the electrical power supplied by a form of battery at a rate small enough to make the practical life of the battery many months.

The invention further contemplates the control system of a container fluid level using an electro-fluid pressure transducer to develop power to position the control valve element adjusting the level, which transducer is adapted to utilize a fluid pressure of the container, or a fluid pressure source developed from natural resources closely adjacent the container.

Figure 2:
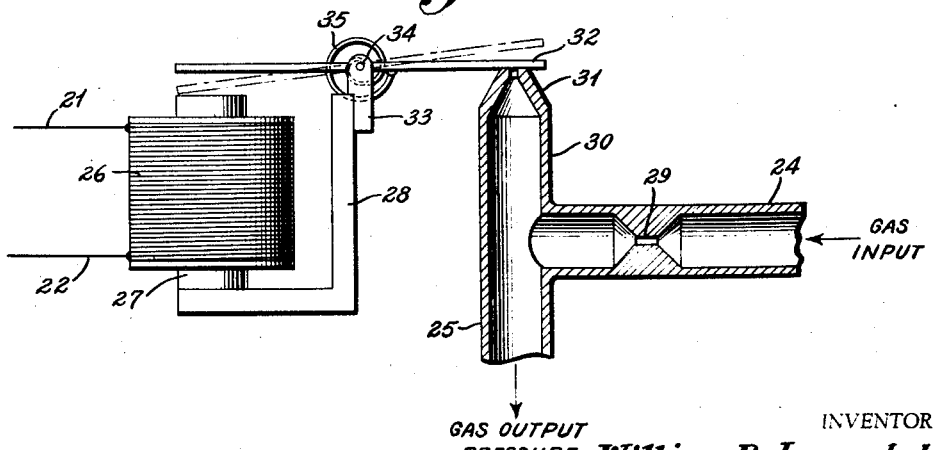

Other objects and advantages of the present invention will become readily apparent from the following detailed description of the invention with a specific reference to the accompanying drawings in which:

Fig. 1 is a schematic block diagram illustrating the control system of the present invention; and Fig. 2 is a view in sections through the electro-fluid pressure transducer which converts electrical energy to fluid pressure energy.

Referring to Fig. 1, a container is represented by tank 10, provided with an outlet pipe 11, connected to pipe 13 through valve 12. Container 10 is to be taken as representative of any number of forms of containers in which the fluid from, or associated with, oil wells are collected for treatment, storage and transmission to other points. The head of a complete oil well is represented at 10A. The flow of fluid may be taken as coming generally to the upper portion of container 10 through conduit 10B and the level of this fluid is established by the modulation of flow between pipes 11 and 13 by the position of valve 12. The ultimate result of the control system of the invention is to position valve 12 to establish a desired level of fluid in container 10.

The location of fluid level in container 10 is directly sensed by electrode-probe 14. The electrode 14, in conjunction with the wall of container 10, is an effective electrical capacitor. The change in capacitance of this primary element is sensed by the control system to develop energy with which to position valve 12 in order that the level of fluid in container 10 will be adjusted in accordance with a predetermined spatial relationship between the fluid level and electrode 14.

Attention is directed to electrical insulator element 15 about electrode 14. Insulator 15 physically isolates electrode 14 from both the contents of enclosure 10 as well as the walls of the enclosure itself. In effect, electrode 14 may be withdrawn from insulator 15, as a receptacle therefor, without the necessity of exposing the contents of container 10 to atmosphere. From one viewpoint, electrode 14 is external of container 10 whose variable fluid level it senses and controls. Thus isolated from physical contact with the contents of container 10, primary element-electrode 14, and the associated components of the control system it actuates, is protected from the corrosive properties of the material within container 10. Aside from this protection afforded, the external location thereby provides for the entire control system the greatest possible accessibility by personnel.

Leads 16 and 17 connect electrode 14 and the wall of container 10 to an electric circuit which converts the capacity of the primary element into a corresponding electrical current or voltage signal. The electronic circuit making this conversion may take many well known forms. On the other hand, it is contemplated that the objects of the invention will be most effectively carried out by a compact, rugged, transistorized circuit. A circuit suitable for transducer 18 may readily be formed of conventional circuits disclosed in at least Garner, Transistors, Coyne Electrical School, Chicago, 1953 at page 55, Fig. 3, and page 95, Fig. 7, and in the 1951 edition of Coyne Television Cyclopedia at page 223, Fig. 29–4. A transistorized circuit will require a very low level of power input through leads 19 and 20. As a practical matter, it is contemplated that a six volt battery, or small generator, will be quite adequate to supply a control system for many months of trouble free operation.

The output of the transistorized, electronic transducer 18, is applied across leads 21 and 22 in order to take the output into an electro-fluid pressure transducer which serves to convert the electrical current or voltage signals into corresponding fluid pressure signals.

The electro-fluid pressure transducer is illustrated, in Fig. 1, by block 23. Subsequently, Fig. 2 will be described as illustrative of one form this transducer may take.

Whatever form the electro-fluid pressure transducer is given, it is contemplated that the fluid pressure power output of the unit will be developed by modifying a fluid pressure brought to it by conduit 24. The supply for conduit 24 could take many forms. The present invention contemplates that this fluid pressure originate, conveniently, from the natural resource of wellhead pressure available closely adjacent to container 10, or the corresponding pressure developed in container 10 itself. It is well within the contemplation of the present invention that an adjacent vessel, tank or container supplied by the wellhead could supply this conduit 24. The fluid pressure of conduit 24 is here shown as coming from wellhead 10A and is modified by electro-fluid pressure transducer 23 in order to establish an output fluid pressure in line 25 which corresponds to the magnitude of the electrical signal of circuit 18 placed on lines 21 and 22. The result is that the modulated output fluid pressure in line 25 is directly related to the capacitance sensed by probe 14 and will actuate control valve 12 in accordance therewith.

Referring to Fig. 2, components of the electro-fluid pressure transducer 23 are illustrated. The electrical input signal is applied to coil 26. The coil is arranged about a magnetic pole piece 27 to form an electromagnet. This electromagnet is mounted on yoke or frame 28. The conduit 24, of Fig. 1 is shown as containing a restriction 29. Conduit 24 and conduit 25 are interconnected in the form of a T. Upper arm 30 of the T terminates in a nozzle 31. A pivoted flapper element 32 controls the flow of fluid from nozzle 31.

Flapper element 32 is pivoted on a bracket 33, attached to frame or yoke 28, by means of a pin 34. A spring 35 attached to the bracket 33, coils about pin 34 and attaches to flapper 32 in an arrangement with which it normally urges the flapper 32 against the nozzle 31 to close the opening of nozzle 31.

The other end of flapper 32 is attracted by the electromagnetic field established through pole piece 27 by an electrical signal in coil 26. Therefore, when the electrical signal output of transistorized circuit 18 is applied to lines 21 and 22, coil 26 attracts its end of flapper element 32, causing the flapper to pivot about pin 34 in opposition to the force of spring 35. When the signal of lines 21, 22 is sufficiently strong, the force of spring 35 is overcome to move flapper 32 away from nozzle 31. The alternate position assumed by flapper 32 has been indicated by dash-dot lines. As a practical matter, the pressure exerted by the fluid within the nozzle, on flapper 32, is sufficiently small to be neglected as a pivoting force.

As the nozzle 31 is co-operated with flapper 32 to vary the flow of fluid pressure from the nozzle, pressure in the output conduit 25 varies. Specifically, as the electrical input signals applied to leads 21 and 22 are increased, the flapper element 32 will rotate in a counter-clockwise fashion, opening nozzle 32 and causing the output pressure in line 25 to fall. Therefore, the fluid pressure in conduit 25 varies inversely as the strength of the electrical signals applied to lines 21 and 22.

It is possible, if desired, to have the fluid pressure output of conduit 25 varied directly as the electrical signals fed into lines 21 and 22. To produce this result, it is necessary only to place nozzle 31 on the other side of the pivot of flapper element 32. Arranged in this manner, the transducer will cause an increase in the output pressure in conduit 25 as the electrical signals in lines 21 and 22 increase to cause the flapper 32 to move toward the nozzle 31.

Control valve 12 is actuated by fluid pressure as developed in conduit 25. As valve 12 is actuated to various positions within its range, the flow of fluid in pipe 11 is regulated to adjust the level of fluid in enclosure 10. By well known arrangements, the valve can be made to either open for an increase in capacitance of the primary element, or to open for a decrease in capacitance. These arrangements can involve the direction in which the fluid pressure of conduit 25 is applied to valve 12 or to the relative positions of nozzle 31 and flapper 32.

The overall function of the system can now be appreciated in its entirety. The electrical capacitor, formed by electrode 14 and the wall of container 10 has its value of capacitance determined by the physical proximity of the fluid in enclosure 10 to the probe-electrode 14. The dielectric constant of the fluid, as the level of the fluid rises to the probe will change the output of this primary element in lines 16 and 17. The probe capacitance is sensed by the circuit 18 and translated into an electrical current or voltage for lines 21 and 22. The result is a positioning of valve 12 in accordance with the physical distance between the probe and fluid level in order to maintain that distance at a predetermined value.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

This application is a continuation-in-part of my application Serial No. 438,499, filed June 22, 1954, now abandoned.

The invention having been described, what is claimed is:

A fluid level control system including, the wellhead of an oil well, a tank located in proximity to the wellhead, a conduit for liquids of the wellhead connected to the tank, a pressure responsive valve in the conduit which is positioned to control the level of well liquids in the tank, a probe mounted in the wall of the tank with which the liquid level in the tank is sensed as a value of capacitance between the probe and wall, an insulating structure between the tank wall and the probe and the liquids and the probe which is made of a material to electrically insulate the probe from the wall and physically protect the probe from contact with the liquids, an electric circuit responding to the capacitance between the probe and tank wall to produce an electric output representative of the spatial relationship between the liquid level and probe, an electro-fluid pressure transducer responding to the electric circuit and supplied fluid pressure originating within the oil well and modifying the fluid pressure originating within the oil well into a fluid pressure control signal representative of the spatial relationship between the liquid level and probe, and means with which to supply the modified fluid pressure originating within the oil well to the pressure responsive valve to control the spatial relationship between the liquid level and probe.

References Cited in the file of this patent

UNITED STATES PATENTS

| | | |
|---|---|---|
| 863,299 | Manning | Aug. 13, 1907 |
| 1,909,469 | Hubbard | May 16, 1933 |
| 2,310,298 | Kuhl et al. | Feb. 9, 1943 |
| 2,477,511 | Comb | July 26, 1949 |
| 2,577,779 | Lindberg | Dec. 11, 1951 |

OTHER REFERENCES

Garner: Transistors, Coyne Electrical School, Chicago, 1953 (pp. 11–18 relied on). (Copy in Scientific Library.)